United States Patent
Reinhardt

(10) Patent No.: US 6,837,933 B2
(45) Date of Patent: Jan. 4, 2005

(54) APPARATUS FOR SURFACE COATING OF SMALL PARTS

(75) Inventor: Eugen Reinhardt, Villingen-Schwenningen (DE)

(73) Assignee: Ernst Reinhardt GmbH Industrieofenbau (DE)

(*) Notice: Subject to any disclaimer, the term of this patent is extended or adjusted under 35 U.S.C. 154(b) by 0 days.

(21) Appl. No.: 10/384,118

(22) Filed: Mar. 7, 2003

(65) Prior Publication Data

US 2003/0168005 A1 Sep. 11, 2003

(30) Foreign Application Priority Data

Mar. 7, 2002 (DE) .......................................... 102 09 908

(51) Int. Cl.⁷ ................................................. B05C 3/00
(52) U.S. Cl. ........................................ 118/418; 118/70
(58) Field of Search ................................. 204/198, 199, 204/201, 212–214; 205/143, 145, 200; 118/418, 56, 52–55, 70, 421, 66, 501; 68/139, 140; 69/30; 427/242

(56) References Cited

U.S. PATENT DOCUMENTS

| 5,458,917 A | 10/1995 | Motohashi et al. |
| 6,090,262 A | * 7/2000 | Ide et al. |
| 6,391,180 B1 | 5/2002 | Brendel et al. |

FOREIGN PATENT DOCUMENTS

| DE | 693 04 820.4 T2 | 2/1997 | ........... C23C/22/00 |
| DE | 197 13 203.0 C1 | 11/1998 | ........... C25D/13/00 |

* cited by examiner

*Primary Examiner*—Brenda A. Lamb
(74) *Attorney, Agent, or Firm*—Pendorf & Cutliff

(57) ABSTRACT

The device for surface coating of small parts is comprised essentially of a device (10) with sequentially arranged processing stations, namely a dip station (11), a drip station (12), a centrifuge station (13) and an emptying station (14). The drums (1) filled with small parts are conveyed from station to station via a longitudinal conveyor (27). Each station has its individual drive, with which the drums (1) can be brought into rotation. The drums are comprised of half shells (2) and (3), which are axially slideable relative to each other, which are opened for filling and closed during processing.

11 Claims, 3 Drawing Sheets

APPARATUS FOR SURFACE COATING OF SMALL PARTS

BACKGROUND OF THE INVENTION

1. Field of the Invention

The invention concerns an apparatus for the surface coating of small parts.

2. Description of the Related Art

The coating, in particular painting, of small parts with recesses such as bores, blind holes, inclusions and cutbacks, is above all difficult in mass production.

As described for example in DE 31 21 397 C1, DE 34 20 859 C2 and DE 36 36 162 C2, the coating of such small parts can occur in a fluidized media using a rotating drum, which is supplied with coating material either by dipping in a dip bath or by spraying in of the coating material.

In order to achieve an even coating of all surfaces of the small parts, the slowly rotating drum according to DE 34 20 859 is first tilted, in which condition the coating material is sprayed in. Thereafter, the drum is brought to an upright position and subsequently caused to rotate rapidly in the manner of a centrifuge.

The mechanics for driving and controlling the drum is comparatively complex and thus is expensive and also frequently in need of repair.

One decisive disadvantage is that the through-put amount or, as the case may be, the through-put time, is dependent upon the slowest process step.

SUMMARY OF THE INVENTION

The present invention is thus concerned with the task, of providing a device of this type, which makes possible with simple construction a larger through-put amount or, as the case may be, a shorter through-put time.

The basic concept of the invention is comprised therein to provide, in place of a single drum, multiple drums which are cyclically provided to a facility with multiple processing stations, arranged sequentially in the processing direction, which via a conveyor are conveyed on from station to station. Each processing station is equipped with its own drive, which is brought into rotational connection with the respective drum which is brought into position. By means of this type of arrangement the individual processing steps are respectively independently carried out in one of multiple of processing stations.

Herein the first station exhibits a dip bath, into which the drum is lowered with slow rotation by means of a lift device. The small parts situated in the drum thereby receive the coating material.

In a next subsequent station, which is equipped with a drip surface, the excess material is allowed to drip with slow rotation of drum. A third station is constructed in the manner of a centrifuge with rapid rotating drive. This process step is primarily for the purpose of making the surface coating uniform.

In a fourth station the drum is subsequently opened, so that the small parts located in the drum can be received by a pallet located therebelow.

For returning and refilling the emptied drum, there is provided between the last station and the first station a conveyor as well as a refilling arrangement.

Preferably, a cleaning device can be provided in the path of the return transport conveyor for the automatic cleaning of the emptied and opened drums. Cleaning can occur either with a high pressure water spray or with ultrasound.

In order to carry out the loading of the returned empty drum as rationally as possible, the filling device includes a round table advancing in cycles or strokes, with which the loading process can occur in individual processing steps.

A particularly preferred manipulation is possible with the drums comprised of two mirror-symmetric half-shells, which are provided axially displaceable on an axle, however fixed against rotation, and by means of a pushing mechanism are slideable towards and away from each other.

In order to load this type of drum these are so positioned such that their axle is vertical, whereupon the provisioning of the opened half shells occurs through the resulting intermediate space via a slide or chute or the like.

For emptying the drum, this is rotated by 90°, that is, it is brought into a position in which the axle extends horizontally. The emptying of the drum, which may be rotating, occurs in that the half-shells are separated axially from each other, so that the small parts located within the drum can exit therefrom through the open slit.

The conveyance means and drive means for drums of this design are extraordinarily simple to construct, when the drum axle projects from the drum half shells on both sides, so that the projecting ends can be brought into operative association with the conveyor, and be brought into rotation by operative engagement with the rotation means provided at each station.

As a longitudinal conveyors there is suitable a pair of lift beams provided on both sides of the facility, which are mounted axially slideable in guide rails and at a distance from each station exhibit upwardly open axle receptacles. The drums with their axles projecting from the sides can be hung there into.

The drum design makes possible an intensive movement of the small parts introduced into the drum and therewith a rapid and even surface coating.

If processing steps should, in individual stations, require substantially more time than in other stations, then multiple stations with the same function can be provided sequentially in the direction of processing.

BRIEF DESCRIPTION OF THE DRAWING

The subject of the invention will be described in the following in greater detail on the basis of an illustrative embodiment shown schematically. In the figures there is shown.

DETAILED DESCRIPTION OF THE INVENTION

In order to facilitate the overview, the details of the drum drive as well as the lift and transportation devices are not shown.

Figure 1:
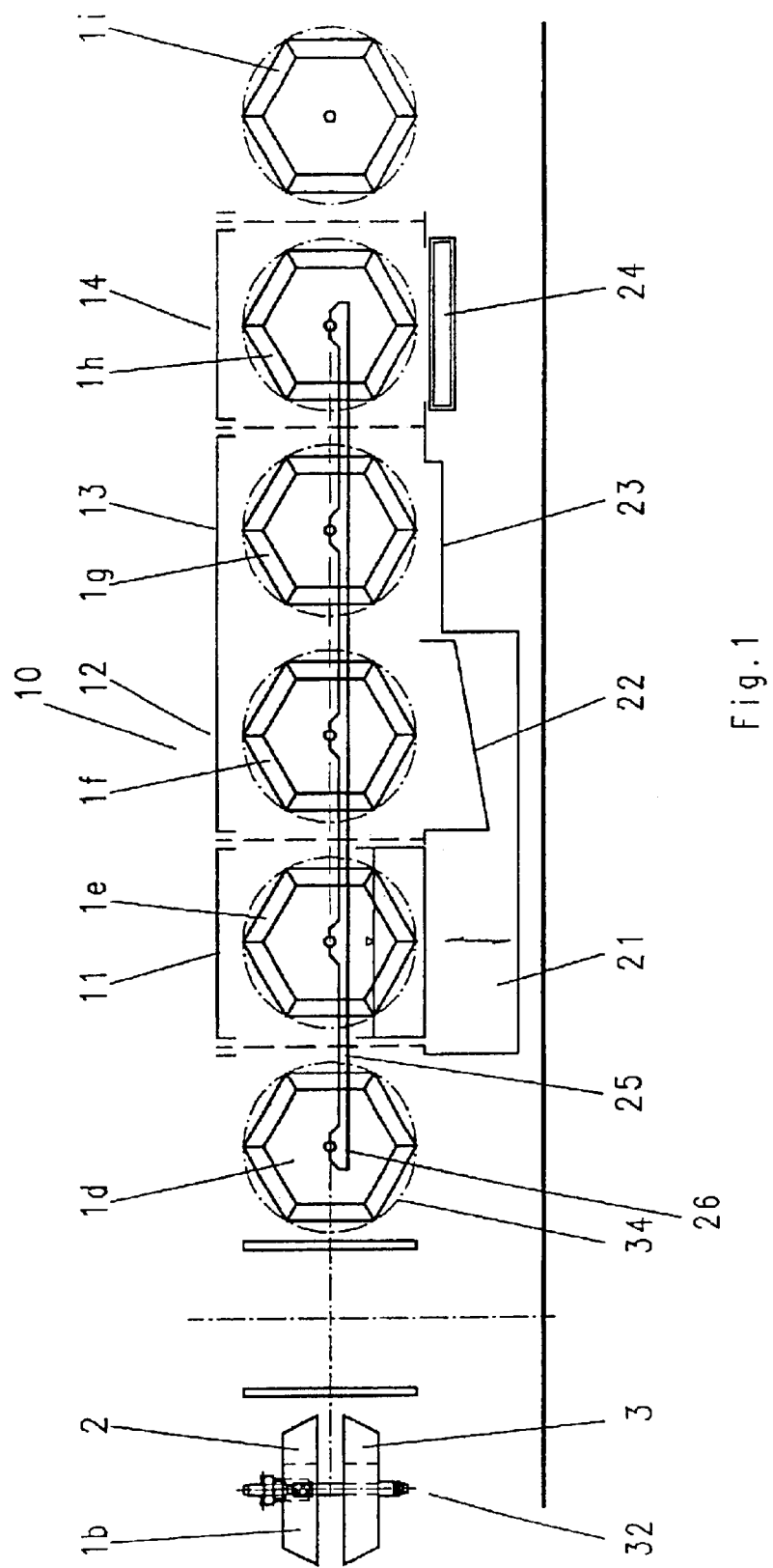
FIG. 1 side view of a facility according to the invention.

The side view according to FIG. 1 shows the facility 10 with four stations, namely, the dip station 11, the drip station 12, the centrifuge station 13 and the emptying station 14. As can be seen from FIGS. 1 and 2, the facility utilizes a plurality of drums, which are moved stepwise from station to station.

Figure 2:
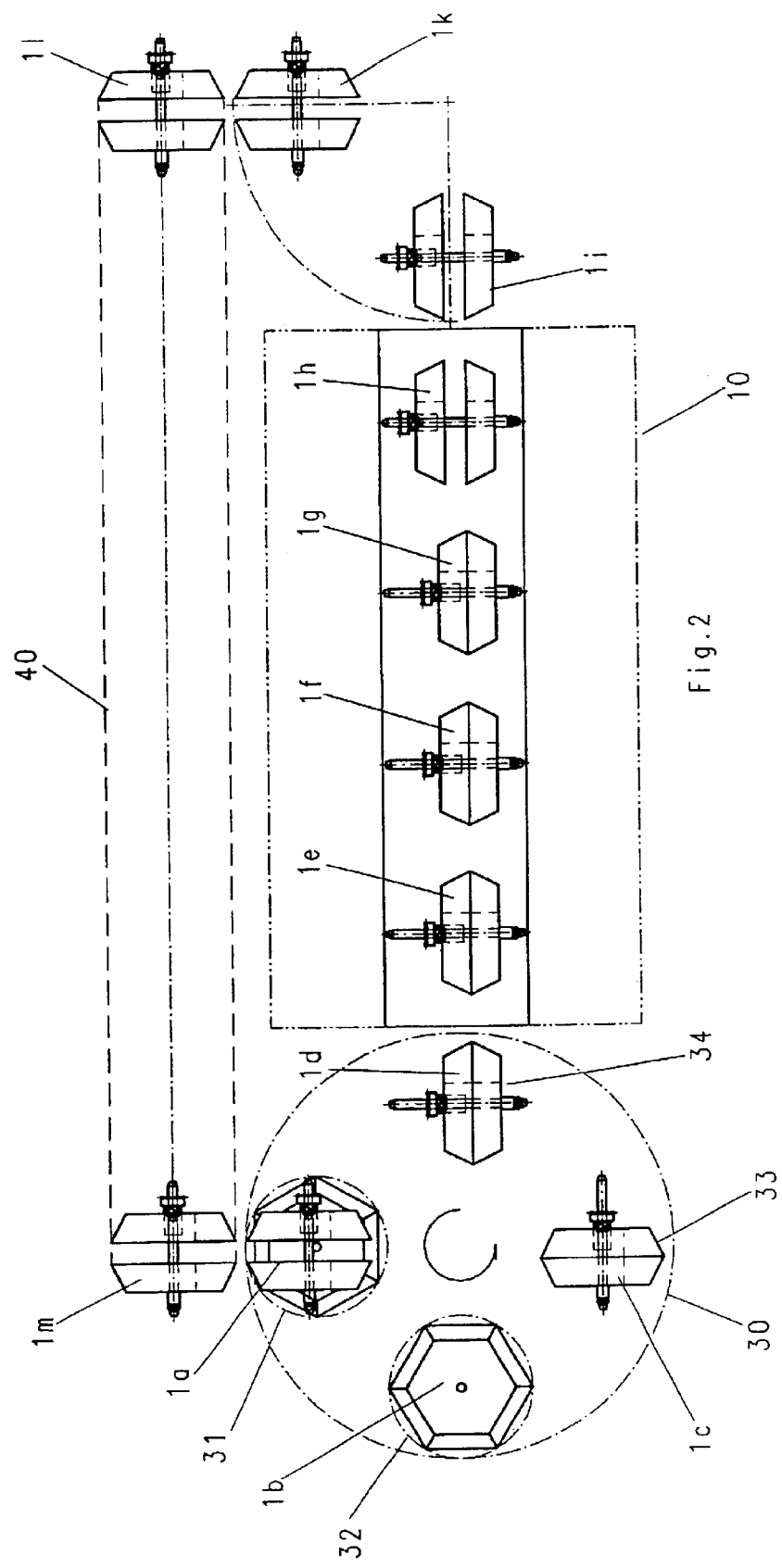
FIG. 2 top view of the facility according to the present invention.

The drum 1d, which is to be filled using the filling device explained in detail on the basis of FIG. 2, is picked up by the lift beams 25 of the longitudinal conveyor and transported by longitudinal movement of the lift beam 25 to the dip station 11. The drum 1e located at the dip station 11 is lowered with slow rotation into the dip bath 21 using a not-shown lift and lowering device. The coating material passes through perforations in the drum into the inside of the drum, whereby as a consequence of the movement of the drum the small parts are coated over their surface.

In the subsequent process step the drum assumes the position 1f in the drip station 12. With slow rotation of the drum 1f the excess coating material drips and is received by the drip sheet 22.

The following spinning station 13 is constructed in the manner of a centrifuge, which causes the drum 1g to rotate rapidly. The centrifugal forces working on the small parts bring about a uniformity of the surface coating. A catch basin 23 is provided below the drum 1g, in which spun off coating material is received.

In the case that the processing time in the drip station and spin station is longer than the other stations, these two stations could respectively be provided doubled.

Figure 4:
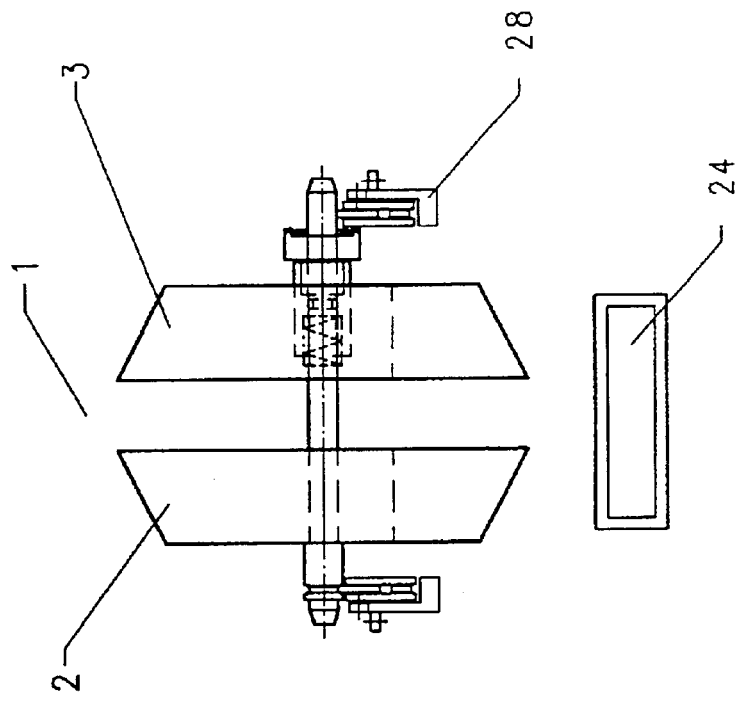
FIG. 4 front view of an open drum located in the emptying station.

In the third station 14 there occurs the empting of the drum 1h in the manner described on the basis of FIG. 4. The coated small parts are collected in an oven pallet 24 provided below the drum 1h and therewith conveyed to a not shown firing oven.

The thus emptied drums 1i through 1m are conveyed back to the filling station along a return conveyor path 40 indicated with dashed lines but however not shown in greater detail.

The filling device includes a round table 30 indicated with dash-and-dot lines, which is moved in the counterclockwise sense in the processing tempo from position 31 to position 34.

Position 31 is a filling station, in which the drum 1a which is still open is rotated out of a position with horizontal oriented axle to a vertical orientation suitable for loading in the filling station 32.

In the filling station 32 the small parts are introduced into the open drum 1b via a not shown slide or the like. Following filling the drum, the half shells are moved towards each other, so that the drum 1c is closed in the closing station 33.

Following a further working step of the round table by 90° the drum 1d reaches the transfer station 34, from which it is transferred to the facility 10 as described on the basis of FIG. 1.

Figure 3:
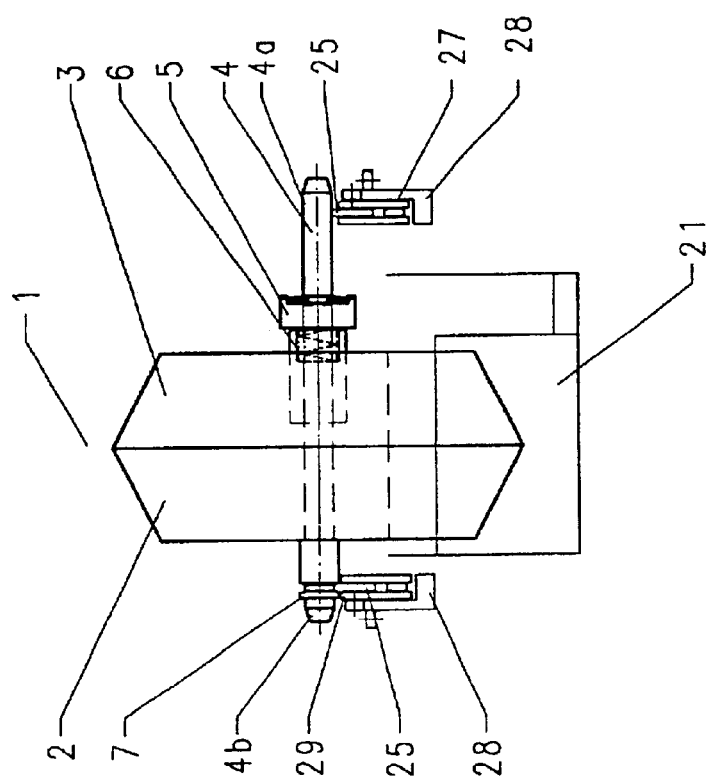
FIG. 3 front view of a drum located in the dip station.

The enlarged views according to FIGS. 3 and 4 make it possible to see details of the drum 1 as well as the drum drive.

The drum 1 is comprised of the two half shells 2 and 3, which are provided axially slideable against the effect of a return spring 6 on the axle 4, however, are mounted fixed against rotation on the axle.

By sliding the drum half shells 2 and 3 from the position according to FIG. 3 into the position according to FIG. 4 the drum is opened, so that the small parts located therein can exit downwards and be received by the oven pallet 24 indicated in FIG. 4. The opening and closing of the drum half shells occurs by means of a not shown, preferably pneumatic or hydraulic actuated articulated lever mechanism which is indicated with reference number 5. In diagonal section the drum half shells 2 and 3 are trapezoid shaped and mirror symmetric to each other, such that the longer trapezoid sides are facing each other. Therewith in the case of opening of the drum a funnel shaped outlet results as shown in FIG. 4. In cross-section the drums 1 have the shape of a hexagon, which encourages an intensive moving or mixing of the small parts within the rotating drum.

Mounting, transport and drive of the drums occurs via the ends 4a, 4b of the axle 4 projecting from the sides, which are received in the individual stations 21 through 24 or as the case may be 34 the upwardly open axle receptacles 26 of the lift beam 25. The end of the axle 4b has a drive pinion 7 which can be brought into operative engagement in the processing station 21 through 24 with a rack or gear of an otherwise not shown rotation drive.

The vertical risible lift beams 25 are provided in longitudinal conveyors 27, which can be moved transversally in guide rails 28.

With this simple device the drums are moved stepwise in positions 1b through 1i and in each station 1 through 14 are lowered in such a manner that they can come into engagement with the respective drive.

In comparison to known devices the inventive facility is less complicated despite the greater number of drums, since tilting and pivoting processes of the drums for the purpose of coating are not necessary.

The comparatively simple design of the drums makes it possible to completely close them. It is further also possible to close off the painting room with stations 11 through 14 in comparison to the environment, whereby the environmental protection via the facility is significantly improved.

For emptying the drum, the half shells are opened close to a receiving pallet, which allows a careful transfer of the coated small parts due to the small height from which they fall.

The decisive advantage of the inventive facility is comprised of its extraordinary capacity. With drum charges with a weight of 100 kilo and a through-put time of 60 seconds, through put amounts in the realm of 8 to 10 tons can be realized.

Reference Number List 1a through m drums
2,3 drum half shells
4 drum axle
4a, b axle ends
5 opening mechanism
6 return spring
7 drive pinion
10 facility
11 dip station
12 drip station
13 spinning station
14 emptying station
21 dip bath
22 drip sheet
23 catch basin
24 oven pallet
25 lift beam
26 axle receptacle
27 longitudinal conveyor
28 guide rail
29 drive gear
30 round table
31 injection station
32 fill station
33 closing station 34 transfer station
40 conveyor

What is claimed is:

1. A device for surface coating of small parts comprising a facility (10) with multiple processing stations (11 through 14) arranged sequentially in the processing direction, in which respectively one of multiple perforated drums filled with small part (1a through 1m) are stepwise conveyed via a longitudinal conveyor (27) and by means of a disengageable drive are brought into rotation, wherein the first station (11) includes dip bath (21), filled with a liquid coating material, in which the drum (1e) is lowered with slow rotation via a lift device, the second station (12) includes a drip pan (22) for catching the excess coating material dripping during slow rotation of the drum (1f), the third station (13) is provided with a rapidly rotating drive in the manner of a centrifuge and the fourth station (14) includes a device for opening and emptying drums (1h) and a pallet (24) for receiving the coated small parts.

2. A device according to claim 1, wherein between the fourth station (14) and the first station (11) a conveyor (40) is provided for return transport of the emptied drums (1i, 1k, 1l) as well as a filling device (30) for charging the drums (1a through 1d) with small parts.

3. A device according to claim 2, wherein the filling device includes a round table (30) rotating stepwise with a first station (31) for locking in and rotating the open drum (1a) in a position which makes filling possible, with a second station (32) for filling the open drum (1b), with a third station (33) for closing and rotating the drums (33) in a position which makes possible the advancement and rotation of the drums (33) as well as a fourth station (34), from which the drum (1d) properly oriented, is passed to the first station (11) of the facility (10).

4. A device according to claim 3, wherein the device or, as the case may be, the round table, includes multiple stations with the same function, which are arranged sequentially in the direction of processing.

5. A device according to claim 2, wherein in the path of the return transport conveyor (40) a cleaning facility is provided for the automatic cleaning of the emptied and opened drums (1i through 1l).

6. A device according to claim 5, wherein the cleaning device includes water jets, with which water is sprayed with high pressure of preferably 1200 bar against the drums.

7. A device according to claim 5, wherein the cleaning device includes ultrasound emitters for producing ultrasound effective for cleaning the drums.

8. A device according to one of claim 1, wherein the drums (1) are comprised of two mirror-symmetric half shells (2, 3), which are provided axially displaceable but fixed against rotation on an axle (4) and which via a thrust mechanism are slideable towards each other and away from each other.

9. A device according to claim 1, wherein the drum axle (4) projects from both sides of the half shells (2, 3) and the projecting ends (4a, b) are in operable communication with the longitudinal conveyor (27) and can be brought into rotational connection with each rotation drive (2, 29) provided in each station.

10. A device according to claim 1, wherein the longitudinal conveyor (27) comprises lift beams (25) provided on both sides of the facility and are mounted transversally displaceable in guide rails (28), and the lift beams (25) include upwardly open axle receptacles (26) spaced apart from the stations (11 through 14), in which the drums (1) can be hung-in via their axle ends (4a, b) projecting from the sides.

11. A device according to claim 1, wherein the drum shells (2, 3) in cross section are multi-sided, preferably hexagonal, and in diagonal section are trapezoid shaped, wherein the drum shells (2, 3) with their longer trapezoid sides face each other.

* * * * *